United States Patent [19] [11] 3,968,349
Hunter [45] July 6, 1976

[54] CONTROL LOGIC SYSTEM FOR ARTICLE-LABELING APPARATUS

[75] Inventor: Mark A. Hunter, Glenview, Ill.

[73] Assignee: Xerox Corporation, Stamford, Conn.

[22] Filed: Sept. 26, 1974

[21] Appl. No.: 509,699

[52] U.S. Cl. .................... 235/61.6 R; 235/61.11 E; 235/61.6 J; 250/570

[51] Int. Cl.[2] .................. G06K 13/18; G06K 15/18; G06K 7/14

[58] Field of Search .................. 235/61.6 F, 61.6 G, 235/61.6 H, 61.6 J, 61.6 L, 61.11 R, 61.11 E, 61.12 R, 61.12 N, 61.6 R; 250/569, 570

[56] References Cited

UNITED STATES PATENTS

| | | | |
|---|---|---|---|
| 2,969,876 | 1/1961 | Luhn | 235/61.6 J |
| 2,989,181 | 6/1961 | Dickinson | 235/61.6 J |
| 3,106,706 | 10/1963 | Kolanowski | 340/146.3 K |
| 3,617,707 | 8/1967 | Shields | 235/61.11 E |
| 3,641,313 | 2/1972 | Watson | 235/61.6 R |
| 3,641,319 | 2/1972 | McGuire | 235/61.12 R |

*Primary Examiner*—Daryl W. Cook

[57] ABSTRACT

Control logic circuitry for providing a physical indication of a change in data labeling information in an article labeling apparatus. The apparatus and control circuitry comprises means for reading and decoding coded indicia adjacent rows of label data irrespective of whether the sheets of label data are read into the reading apparatus head first or foot first.

14 Claims, 19 Drawing Figures

| SEL. | A | B | Y |
|---|---|---|---|
| L | L | | L |
| L | H | | H |
| H | | L | L |
| H | | H | H |

| | U11A OUTPUTS b | c | d | e | U15A OUTPUTS b | c | d | e |
|---|---|---|---|---|---|---|---|---|
| A-Z (HEAD) | 6 | 5 | 4 | 3 | | 2 | 1 | 5 |
| Z-A (FOOT) | 5 | 1 | 2 | | 3 | 4 | 5 | 6 |

| | U21A OUTPUTS b | c | d | e | U20A OUTPUTS b | c | d | e |
|---|---|---|---|---|---|---|---|---|
| A-Z (HEAD) | | 6 | 5 | 4 | 3 | 2 | 1 | |
| Z-A (FOOT) | | | 1 | 2 | 3 | 4 | 5 | 6 |

| SELECT INPUTS | | | |
|---|---|---|---|
| A | B | C | OUTPUT CONNECTION |
| H | H | H | D7 |
| L | H | H | D6 |
| H | H | L | D3 |
| H | L | H | D5 |

PARTIAL TRUTH TABLE FOR DATA SELECTOR U17A

SYSTEM CLOCK AND HEAD LOCKOUT LOGIC

CONTROL LOGIC SYSTEM FOR ARTICLE-LABELING APPARATUS

BACKGROUND OF THE INVENTION

1. Field of the Invention

The invention pertains to control circuitry for separating and labeling items in an article labeling machine.

2. Description of the Prior Art

Labeling machines and associated control circuitry are known in the prior art as illustrated by the Watson U.S. Pat. Nos. 3,641,313, 3,614,088, 3,708,368, 3,578,316 and 3,709,756. These machines are utilized to read a coded labeling sheet such as disclosed in the McGuire U.S. Pat. No. 3,641,319 and in the above-mentioned Watson patents. These systems are designed to read the coded label form in only a single orientation and provide only limited flexibility within the control circuit.

SUMMARY OF THE INVENTION

An object of the invention is to provide a control circuit for reading coded data on labeled sheet irrespective of whether the sheet is fed into the reading device head first (frontwards) or foot first (backwards).

A further object of the invention is to provide a control circuit and a control signal for producing a visual indication of a change in a series of label codes to facilitate ease of separation of labeled articles such as zip code changes.

A further object of the invention is to provide a feeder lockout mechanism to temporarily halt the feeding of articles to be labeled upon a change in article labels such as zip code labels as determined by a code reader.

The instant invention pertains to the control circuitry utilized in the operation of a labeling machine such as utilized for address labeling from large mailing lists. A plurality of rows of labels are provided on a label form which is generally derived directly from a computer fanfold printout sheet. The computer form is the label input form of the instant apparatus, and each row on the form contains a code indicative of a change in label data such as a change in zip code. The code is read by optical reading means and a control circuit is utilized to provide the operator with a visual indication of the change in zip code as, for example, by arresting the feeding mechanism to cause a gap in the output of the labeling machine. The control mechanism is designed so that the labeling form may be fed into the reading apparatus either head first or foot first without affecting the nature and timing of the visual indication of the zip code change.

BRIEF DESCRIPTION OF THE DRAWINGS

Other objects and advantages of the invention will become apparent in reference to the following specification and drawings wherein:

FIGS. 6*a* and 6*b* are detailed schematic diagrams of the control circuitry of the instant invention;

FIG. 6*c* is a truth table for data selectors utilized in the instant invention;

DETAILED DESCRIPTION OF THE PREFERRED EMBODIMENT

System Overview

Figure 1:
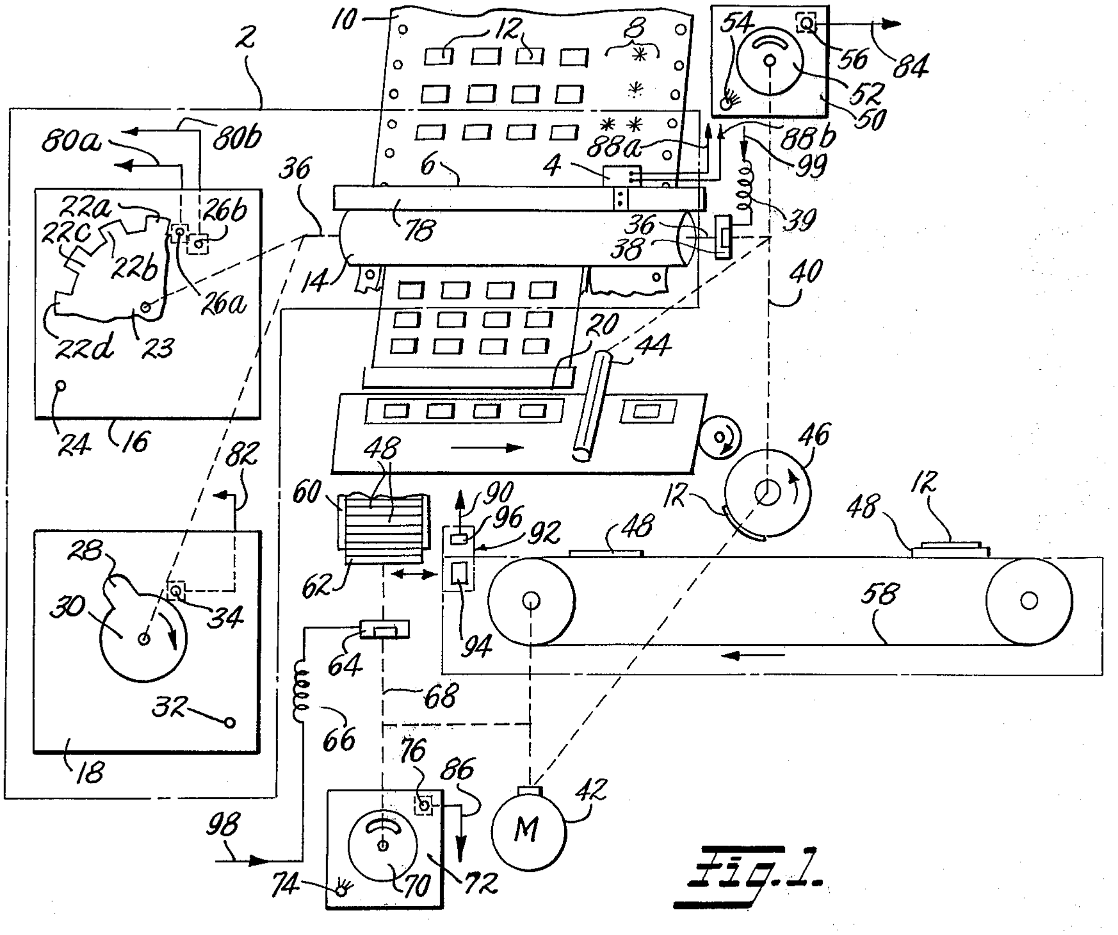
FIG. 1 is a schematic drawing of the mechanical system and sensors employed in the instant invention.

FIG. 1 illustrates a schematic diagram of the major mechanical components of the system together with the sensors utilized in the electronic control system. For a more detailed explanation of mechanical systems which may be controlled by the circuitry of the instant invention, reference is made to the above-identified Watson patents, as well as to the patents to Kirk et al U.S. Pat. Nos. 3,554,843 and 3,586,585.

The apparatus illustrated in FIG. 1 comprises a head assembly 2 having a code reading means 4 mounted on a support bar 6. The reading means 4 is adapted to be slidably positioned over the coded section of a sheet-like form 10. The sheet-like form 10 contains a plurality of labels 12 arranged in rows, and each row has an adjacent coded section 8 used to provide information as to a change in label data, such as zip code changes. The sheet-like form 10 may, for example, be the direct fanfold output from a computer printing terminal, and the form is moved past the reading means 4 by means of a sprocket drive element 14. The drive element 14 is mechanically connected to a finger mechanism 16 and guillotine sensor 18. Also mechanically connected to the drive element 14 is a guillotine knife 20 used to cut a row of labels from the form 10. The finger mechanism 16 is provided with a plurality of fingers or notches 22*a*–22*d* used to block off a light path from source 24 to photosensors 26*a* and 26*b*. In a similar fashion, a notch 28 in a revolving disc 30 of guillotine sensor 18 is utilized to block light from source 32 to photosensor 34. The rotation of the disc 30 as well as the movement of arm 23 is mechanically linked to the rotation of the sprocket drive element 14. The sprocket drive element 14 is rotated by means of a drive 36 connected to one side of a pin clutch 38 which is operated by means of a solenoid 39. The other side of the clutch 38 is connected to a drive shaft 40 which is powered by motor 42. The drive shaft 40 is also mechanically linked to a roller cutter 44 which is rotated to cut each label in a row after the row itself has been cut by the guillotine knife 20 from the label form 10.

Connected to the drive shaft 40 is a pad assembly 46 which is used to transfer the cut labels onto conveyed articles or media 48. A head lockout sensor 50 is also driven by the drive shaft 40 and comprises an apertured disc 52 rotated to intercept a light beam from source 54 to photosensor 56. The motor 42 is also utilized to drive a conveyor belt 58 which is used to support the articles 48. Articles 48 are stacked in a hopper 60 and are fed out one at a time by means of a reciprocating shuttle 62. Shuttle 62 is operated by means of a clutch 64 and activating relay 66. The clutch 64 is connected to motor 42 by means of a drive member 68 which is also utilized to rotate an apertured disc 70 of a feeder lockout sensor 72. The apertured disc 70 is utilized to block out a light beam from source 74 to photosensor 76.

In operation, the form 10 is inserted into the head assembly 2 and the code reading means 4 is positioned over the coded section 8 adjacent each row of labels. It is important to note that the form 10 may be inserted such that the coded sections are on the right hand side or left hand side of the head assembly. The code reading means may be slid along the support 6 for alignment. The ability to read the incoming code in ciher configuration of the label form 10 (head or foot first) is a distinct advantage of the instant invention over the prior art. After the coded sections 8 are read by the reading means 4, the sprocketed drive mechanism passes the form 10 to a guillotine knife 20 which cuts a complete row of labels. The cut row 20 is then fed in the direction shown by the arrow towards a roller cutter 44 which separates each label in a given row and passes the cut label to the pad assembly 46. The pad assembly 46 may, for example, be a heating element used to activate a compatible heat sensitive form 10. The pad 46 could alternately be used to apply glue for securing the labels to the conveyed articles 48. The apparatus shown in FIG. 1 utilizes a plurality of sensors to provide control signals in the electronic control system. For example, finger mechanism 16 provides enabling pulses to the reader control circuitry in synchronism with the alignment of the coded sections 8 along the path of the optical reading means 4. Output signals from the photosensors 26*a* and 26*b* are provided to the control circuitry along lines 80*a* and 80*b*, respectively. In addition, the guillotine sensor provides an output signal along line 82 when the guillotine knife has completed its cut of a row of labels. Likewise, the head lockout sensor 50 and the feeder lockout sensor 72 provide output signals along lines 84 and 86, respectively at various points in the machine cycle as is more fully explained below. The code reading means 4 provides an output signal for each of two channels of coded data along lines 88*a* and 88*b*, respectively. In addition, another signal is supplied over line 90 to the control circuitry. The signals originate from a medium sensor 92 having an aligned light source 94 and photosensor 96. Any article which is properly fed from the hopper 60 will activate the medium sensor 92. Additionally, signals from the control circuitry are supplied along lines 98 and 99 to operate solenoids of the clutches 64 and 38 of the feeder lockout and head lockout systems respectively.

Figure 2A:
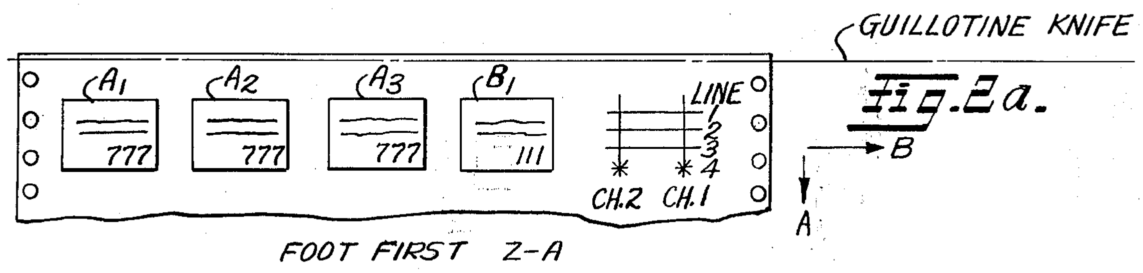
FIGS. 2*a* and 2*b* are illustrations of the sheet-like form bearing the labels to be affixed to the articles illustrating the foot first and head first orientations, respectively.
Figure 2B:
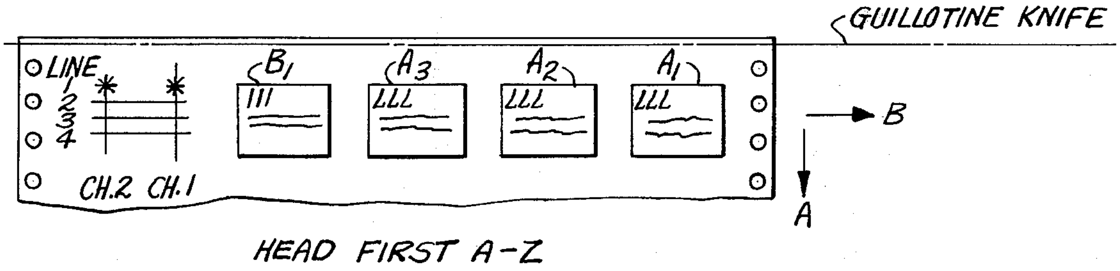

FIGS. 2*a* and 2*b* illustrate a single row of labels together with the code sections 8 for foot first and head first orientations, respectively. The dotted line in each figure indicates the position of the quillotine knife upon cutting the sheet-like form 10. The arrow labeled A indicates the direction of the form 10 before being cut by the guillotine knife and the arrow labeled B indicates the direction of motion of the form subsequent to being cut by the guillotine knife. It can be seen that FIG. 2*b* is merely an inverted drawing of FIG. 2*a*. In the preferred embodiment of the system, the coded section is utilized to indicate the last member of a group of similar data codes. For example, in FIG. 2*a* and label $A_3$ is the last member of the group of labels bearing zip code 777. Label $B_1$ is the first member of a group of labels having a different zip code. The code points to the label $A_3$. If the sheet 10 were turned around and fed into the machine as shown in FIG. 2*b*, the code would also be turned around and the electronic control system is designed to read the code in either orientation.

Figure 3:
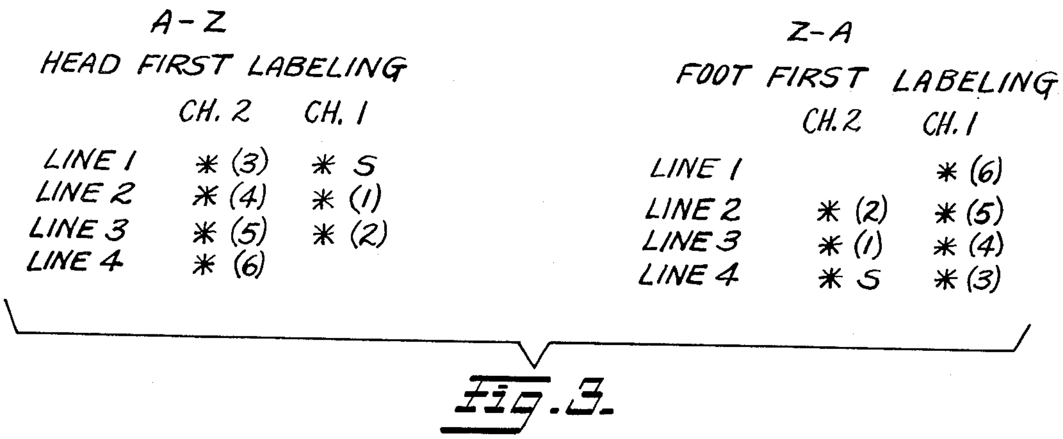
FIG. 3 is an expanded view of the code format used in the head first and foot first orientations of the labeling sheets.

FIG. 3 shows a more detailed view of the code format for both the head first and foot first orientation. In both labeling formats, there are two channels of information. A synchronization bit (S) is always utilized adjacent each and every row of labels. The number of code lines in each code section 8 adjacent a given row of labels will depend upon the number of labels in a given row. For example, if no more than 5 labels are utilized in a given row (the "five-up" situation), only three lines would be necessary to designate which of the five labels is the last in the series of similar labels. However, if a "six-up" condition is utilized, wherein six labels appear on a given row, the coded section adjacent each row would comprise four lines of data, each line having two channels.

Figure 4:
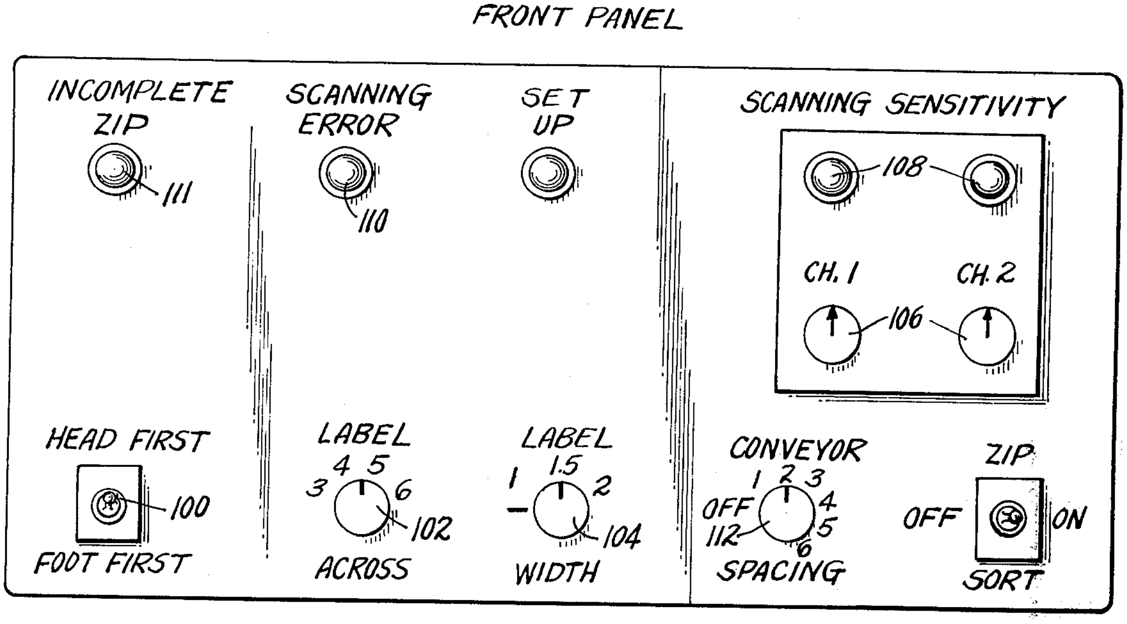
FIG. 4 is a schematic of the control panel utilized in the instant invention.

FIG. 4 is a schematic illustration of the front panel control for the labeling machine and comprises a two-position switch 100 for indicating a head first or foot first orientation of the form 10, a "label across" indicator and dial 102 used to designate how many labels are in a given row and a "label width" indicator and dial 104 used to indicate and set the width corresponding to the width of the labels on the particular form 10 utilized. Also shown in FIG. 4 are sensitivity control means 106 for the code reading means 4 as well as indicator lights 108 which are energized when the coded information is read by the reading means. A scanning error light 110 is also shown on the control panel, together with an "incomplete zip code" light 111. The operation of the various switches and dial indicators is explained more fully below in connection with the operation of the electronic circuit.

Figure 5:
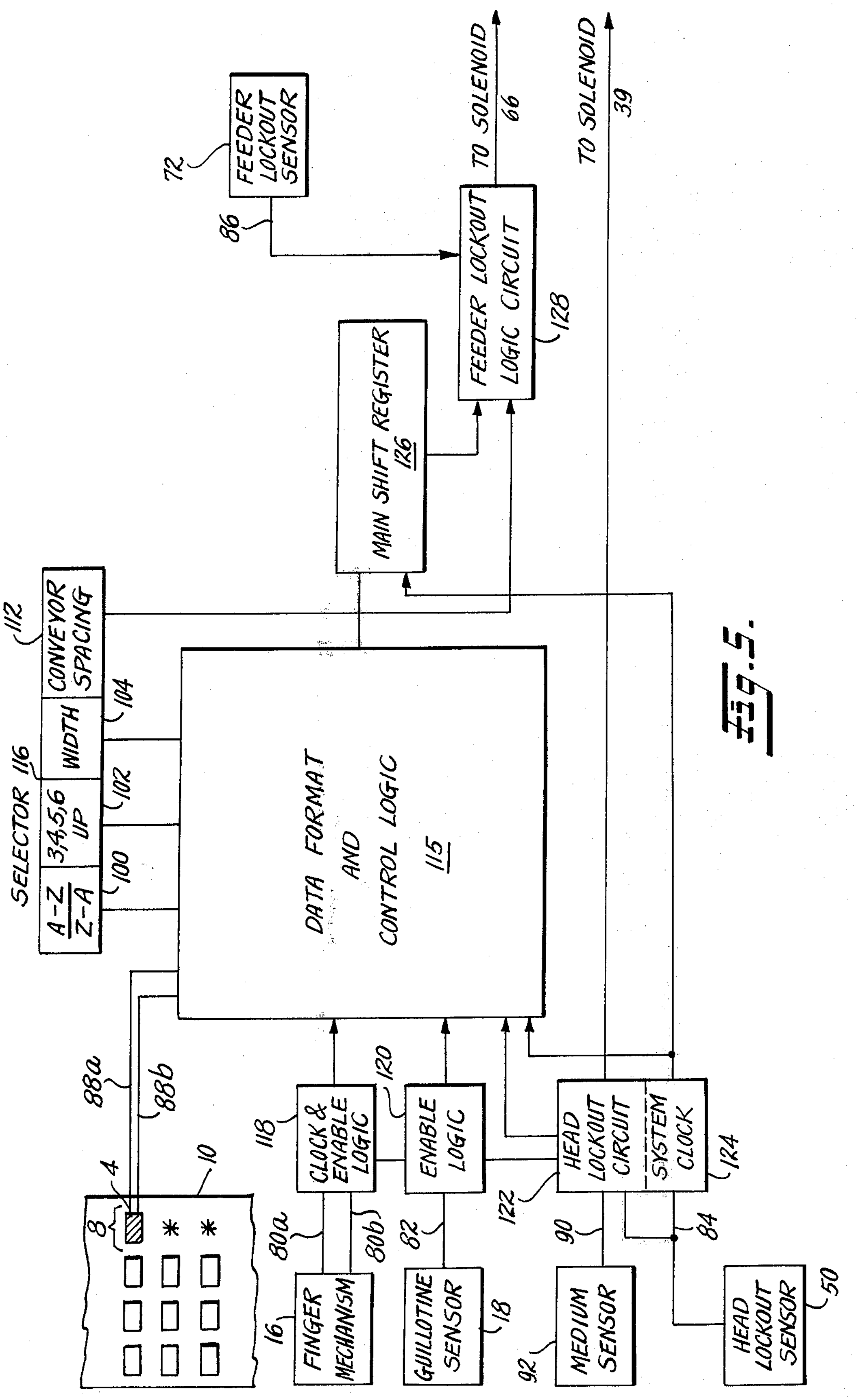
FIG. 5 is a block diagram of the electronic control system.

FIG. 5 is a schematic of the overall electronic control system of the instant invention. Code data is read from form 10 by the reading means 4 which is connected to a data format and control logic circuit 115. A selector 116 supplies input parameter control signals to the data format and control logic 115 from the front panel dials controlling A-Z/Z-A options, 3–6 up options as well as width and spacing control. The finger mechanism 16 supplies signals along lines 80*a* and 80*b* to a clock and enable logic 118 which in turn feeds various components of the data format and control logic 115 as explained more fully below. Likewise, the guillotine sensor 18 supplies signals over line 82 to an enable logic circuit 120 which in turn feeds various shift registers within the data format and control logic 115. The medium sensor 92 supplies a head lockout circuit 12 with a "medium present" signal over line 90. Also, timing pulses are supplied to the head lockout circuit 122 from the head lockout sensor 50. The head lockout circuit 122 controls both the head lockout solenoid 39 of clutch 38 as well as serves to halt further clocking of data by controlling a system clock 124. The head lockout circuit and the system clock are both connected to the data format and control logic 115 and the system clock is also connected to a plurality of shift registers forming a main shift register 126. The main shift register 126 is responsible for storing the code data from the form 10 until the proper label (representing the last in a group of similar zip codes for example) is ready to be secured to the conveyed articles 48. The length of the shift register depends on whether 3,4,5 or 6 up form is used, the distance behind the guillotine knife the reading means is positioned, and the label width of the labels employed. The output of the main shift register 126, together with timing pulses from the feeder lockout sensor 72 via line 86, controls a feeder lockout logic circuit 128. The feeder lockout logic circuit 128 in turn controls the operation of solenoid 66 of clutch 64 to stop the feeding of articles from the hopper for providing a physical spacing on the conveyor system for separating different zip code groups.

DESCRIPTION OF ELECTRONIC CONTROL LOGIC SYSTEM

FIGS. 6 and 7 show detailed schematic diagrams of the electronic control system utilized in the instant invention.

Finder Mechanism and Scan Signals

Figures 6B, 6C:
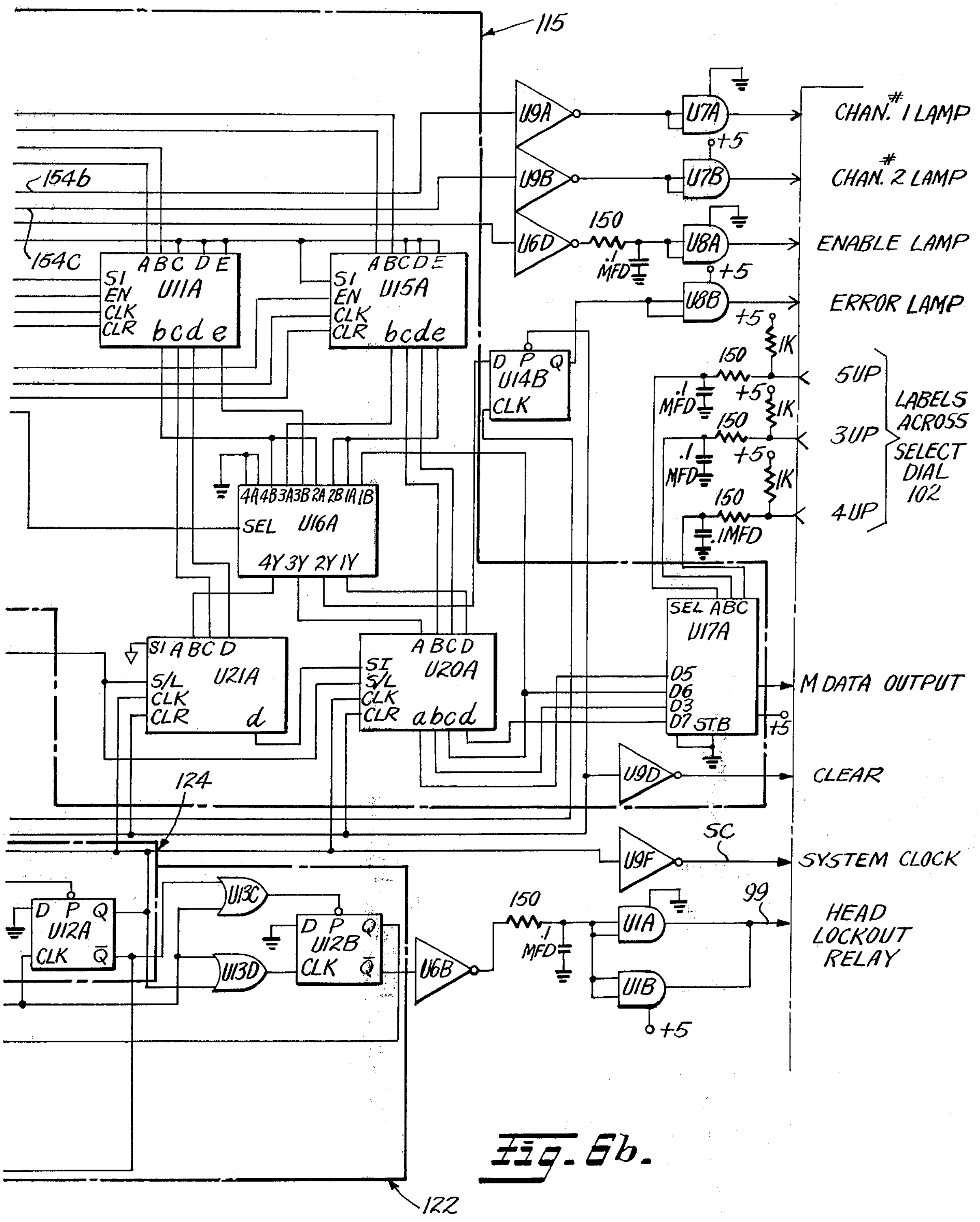

As shown in FIGS. 6*a*, the reading means 4 contains two phototransistors Q1 and Q2 which are used to detect the asterisks appearing in channels 1 and 2 of the coded sections 8. Upon detection of an asterisk on the form 10, phototransistors Q1 and Q2 turn off causing a positive or high signal on output lines 88*a* and 88*b*. The sensitivity of the reading means 4 may be controlled by means of potentiometers 150*a* and 150*b* which are connected to the front panel control dials or sensitivity means 106 (FIG. 4). Lines 88*a* and 88*b* are connected to the positive terminals of operational amplifiers U4 and U5, respectively. The op amps are utilized as voltage comparators and a positive input on lines 88*a* or 88*b* results in a positive or high signal at output terminals 152*a* and 152*b*, respectively. The logic output of amplifier U4 is fed to terminals 3A and 4B of a data selector U10A via a voltage limiting zener diode and associated buffer AND gate U3B. Likewise, the output signal of amplifier U5 on terminal 152*b* is fed to terminals 1A and 2B of data selector U10A via a zener diode and associated buffer AND gate U3C. The outputs of AND gates of U3B and U3C are also fed along lines 154*b* and 154*c*, respectively to respective inverters U9A and U9B and lamp drivers U7A and U7B (FIG.6*b*). Thus, upon detection of an asterisk by the reading means 4, the channel 1 and/or channel 2 lamps (108 of FIG. 4) will be energized. The lamps provide a visual indication of the output of the reading means 4, and may also be utilized in adjusting the sensitivity control means 106 during set-up The data selector U10A is a quad two-lines-to-one-line data selector which is utilized to load a pair of shift registers U11A andU15A, one shift register for each channel. The loading of the shift registers U11A and U15A will depend upon whether the form 10 is read in the head first (A-Z) or foot first (Z-A) orientations. The loading of the shift registers is also dependent upon whether three or four lines of coded data is read by the reading means as illustrated in FIG. 3. The label across indicator and dial 102 of FIG. 4 is set to the appropriate number of labels per line as appears on the form 10. If a six-up mode is utilized, then four lines of code are employed, whereas if five-up or less appears on the form, then only three lines of coding need be used. The operator manually adjusts the dial 102 to the appropriate number of labels per line, which effectively places a high signal on the "3-4 select" line 156 for the five-up or less condition and a low signal on line 156 for the six-up form (four line condition). Likewise, the switch 100 (FIG. 4) places a high signal on line 158 for the head first format (A-Z), and a low signal on line 158 for the foot first format (Z-A). Lines 156 and 158 are fed to a AND gate U3A, whose output is used to control the select terminal (SEL) on the data selector U10A. The truth table corresponding to the operation of the data selector U10A is shown in FIG. 6*c*. If the select terminal is low, the A input signals of the data selector U10A are fed to corresponding Y output terminals, whereas if the select terminal is high, the B input terminals are fed to the corresponding Y output terminals. As is seen in FIGS. 6*a* and 6*b*, the output terminals 1Y and 2Y are fed to A and B input terminals of shift register U11A, whereas the output terminals 3Y and 4Y of the data selector U10A are fed to input terminals A and B of the shift register U15A. The outcome of the loading technique provides that the B input terminals of both shift registers U11A and U15A are fed with input data only if three lines of coding are utilized and the form 10 is read in the head first (A-Z) mode. For all other cases, the output data from the data selector U10A is fed to the A input terminals of shift registers U11A and U15A.

The shifting of data through the shift registers U11A and U15A is controlled by means of clock signals supplied by the fingers 22*a*–22*d* of the finger mechanism 16 as shown in FIG. 1. Photosensors 26*a* and 26*b* are connected to the output lines 80*a* and 80*b*, respectively. Line 80*a*, is the scan enable signal whereas line 80*b* is the scan clock signal. Each finger of the arm 23 is wide enough to block the light to only one of the photosensors 26*a* and 26*b* at a given time and the gap between fingers is wide enough so that only one photosensor is blocked. Thus, a first finger 22*a* would block the photosensor 26*a* providing a low signal to input line 80*a*. At a later time during the advancement of form 10, arm 23 rotates and finger 22*a* moves off of photosensor 26*a*, exposing it to the light source 24 and thus causing the signal on line 80*a* to go high. At a still later time, the finger 22*a* blocks photosensor 26*b* causing a low signal to appear on input line 80*b*. Finger 22*a* then re-exposes photosensor 26*b* upon further advancement of the paper. At a still later time, the time corresponding to the reading of the second line of code, a second notch or finger 22*b* covers photosensor 26*a* and the process is repeated providing a scan enable signal along line 80*a* and a scan clock signal along line 80*b*. Three fingers or notches are utilized if three lines are to be scanned by the reading means, whereas four notches are needed if four lines (six-up condition) are scanned.

The finger mechanism is synchronized with the coded sections 8 of the form 10, so as the finger mechanism passes the photosensors 26*a* and 26*b* at the time the reading means is positioned over the coded sections 8 on the form 10. When the signal on line 80*a* goes low, indicating that the first finger has blocked the photosensor 26*a*, transistor Q3 is turned off causing a high to appear at its collected terminal. The high signal is fed to a Schmitt trigger U2A which also acts as an inverter and consequently causes a square negative pulse (fast rise time and fast fall time) to appear at its output terminal. The negative pulse is fed to the input of an inverter U6A and also to a preset terminal P of a flip-flop U14A. The $\overline{Q}$ output of flip-flop U14A is fed to the clock terminal of shift registers U11A and U15A to act as a primer signal. In addition, a high logic signal appears at the output of inverter U6A which is fed to the enable terminals of shift registers U11A and U15A. This allows data to be input in parallel form to the input terminals A and B of shift registers U11A and U15A. After the first finger 22*a* passes over the first photosensor 26*a*, the signal on input line 80*a* goes high and consequently the enable signal at the output of inverter U6A goes low. This prevents any further loading of the shift registers U11A and U15A regardless of any input signals on the input terminals A and B of the respective shift registers. Data is shifted down the shift registers by a clock signal which originates when the finger 22*a* passes over the second photosensor 26*b*. At this time, a low signal appears on input line 80*b*, which causes a high signal to appear at the collector of transistor Q4. This high signal is again squaredup and inverted by a Schmitt trigger/inverter U2B and used to reset the flip-flop U14A. The output terminal $\overline{Q}$ of flip-flop U14A consequently goes high, which signal is fed to the clock terminal of shift registers U11A and U15A to cause a one register shift in the data. The loading of the shift registers and subsequent shifting is repeated each time one of the fingers 22*a*–22*d* pass over the photosensors 26*a* and 26*b*.

Data Format control

Figure 8A:
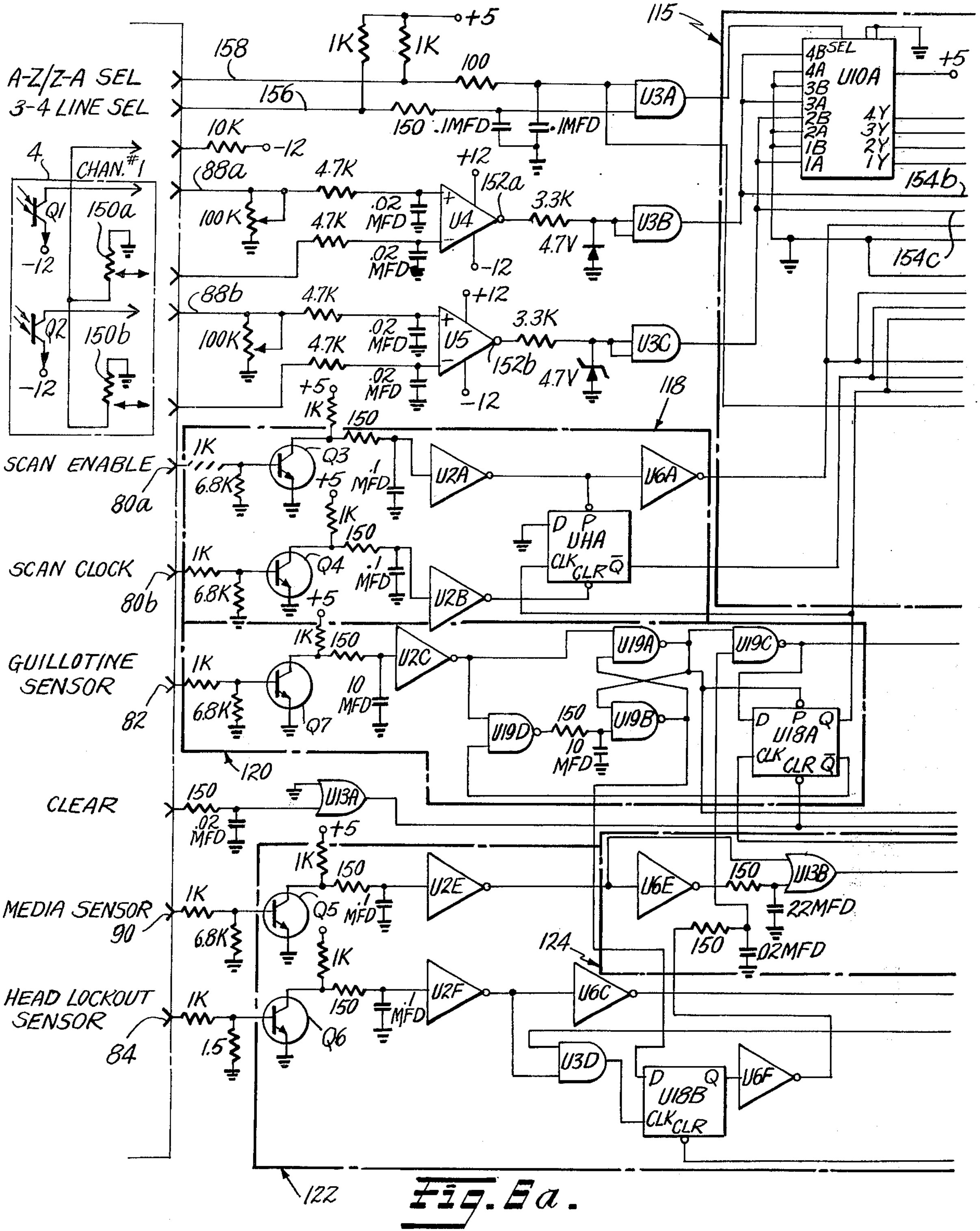
FIGS. 8*a and 8b* are diagrams of the output conditions of shift registers utilized in the instant invention.

After a complete code section (three lines or four lines) has been read, the output terminals *b*, *c*, *d* and *e* of shift registers U11A and U15A appear as shown in FIG. 8*a*. FIG. 8*a* shows the output terminal conditions for both a head first and foot first orientation. For example, if in the head first orientation (A-Z), the fourth label of a five-up form is the last member of a series of common zip codes, then the output terminal *d* of U11A would contain a logical 1 (high signal) and, output terminal *e* of shift register U15A would be high from reading of the sync bit which is always present. All other output terminals of the shift registers would contain logical zero states.

The outputs of the shift registers U11A and U15A are transferred to a second set of shift registers U21A and U20A. However, the output data is not transferred directly between the two sets of shift registers, but is reformated by utilizing a data selector U16A which is a quad two-line-to-one-line data selector having the same truth table as the data selector U10A. The necessity for reformating stems from the fact that the circuit is utilized for both head first and foot first orientation, although as seen in reference to FIGS. 2*a* and 2*b*, the machine lockout cycle for the head first orientation must be delayed relative to the foot first orientation, so as proper markings or separation of the different zip code groups is achieved. If the code signals for head and foot first orientation were treated identically, then if label $A_3$ of FIG. 2*a* is the last member of the group for foot first orientations, one would wish to provide a marker (or spacing in the article conveyor) after label $B_1$, whereas in the head first orientation one wishes to provide a marker after label $A_3$. Since the code always identifies label $A_3$ in both head and foot orientations, one must delay the head code signals relative to the foot code signals. Thus, the data selector U16A is utilized to make the conversion from the A-Z to the Z-A format, and the outputs of shift registers U21A and U20A of FIG. 8*b* reflect the desired electronic delay of the head first orientation. The output terminals *c* and *d* of shift register U11A are connected directly to the input terminals C and D of shift register U21A. Similarly, output termnals *c* and *d* of Shift register U15A are connected directly to the input terminals B and C of shift register U20A. However, the remaining terminals are fed to the data selector U16A and subsequently to various terminals of the shift registers U21A and U20A as shown.

Figure 7A:
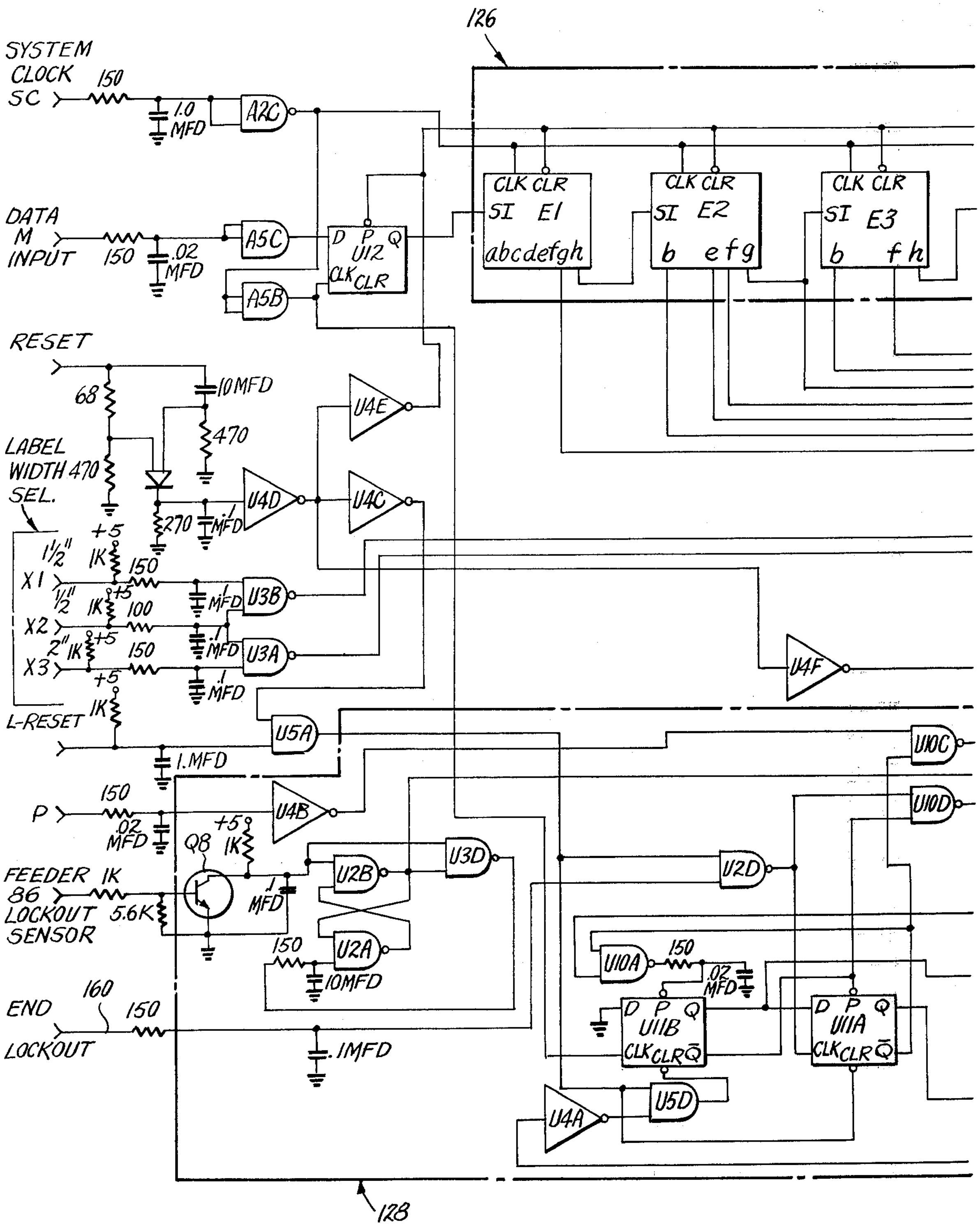
FIGS. 7*a* and 7*b* are detailed schematic diagrams of the control circuitry of the instant invention.
Figure 7B:
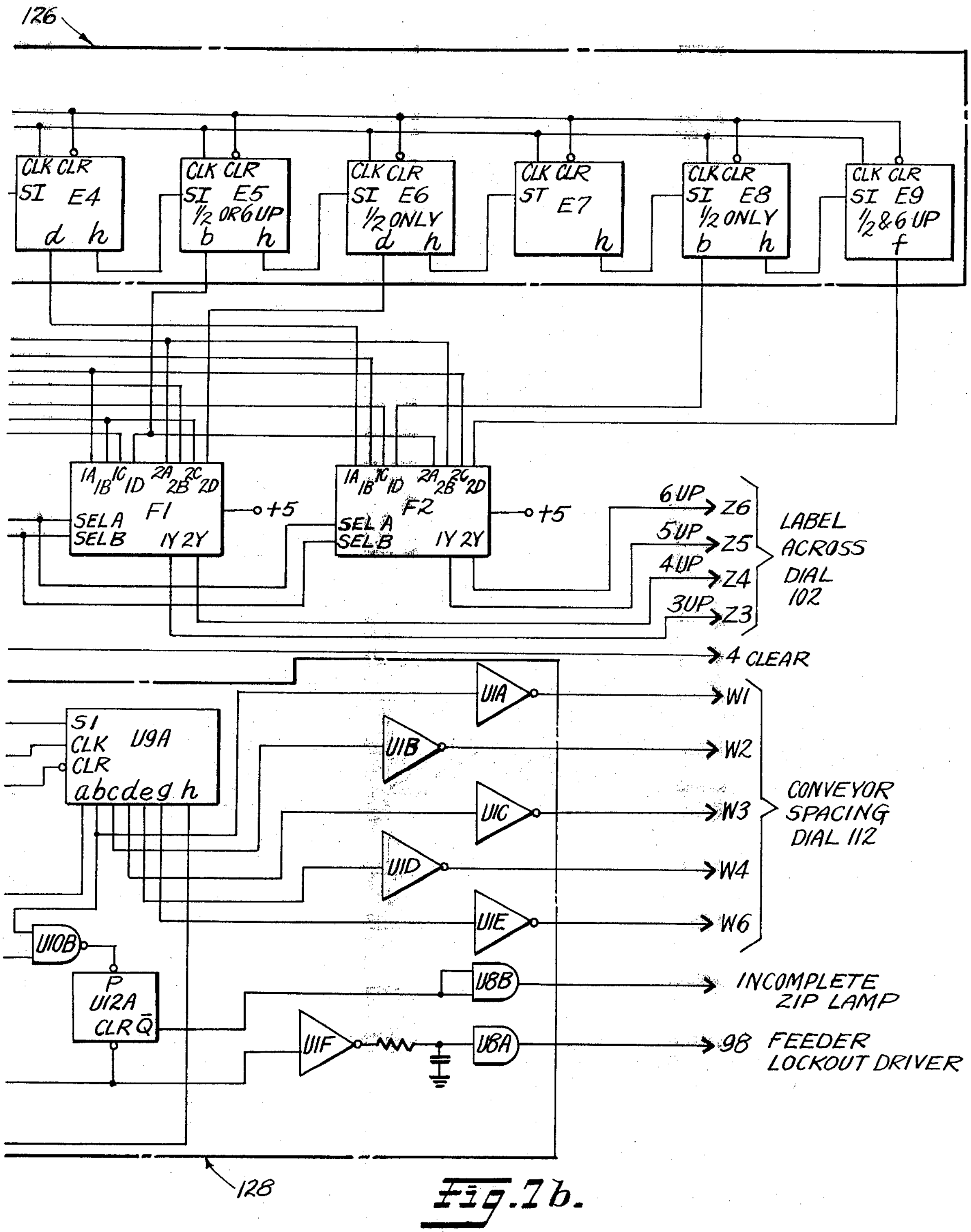
Figures 8A, 8B, 9, 10:
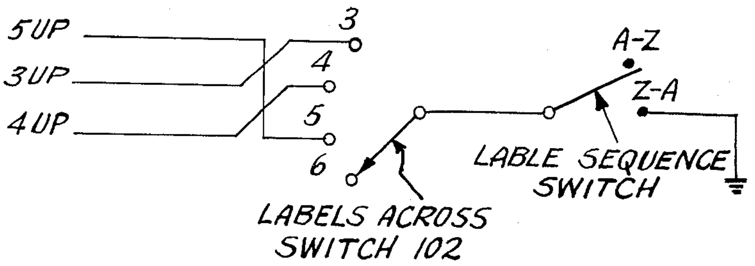
FIG. 9 is a diagram of the truth table for another one of the data selectors utilized in the instant invention.
FIG. 10 is a schematic diagram showing the various switch connections to the data selector utilized in the invention; and, FIGS. 11–14 are timing diagrams illustrating the operation of the control circuitry of FIGS. 6 and 7.

The main shift register 126 is shown in detail in FIGS. 7*a* and 7*b* and is fed by the shift registers U21A and U20A. For the A-Z labeling, the d output terminal of shift register U20A is the output which feeds the main shift register 126 via a data selector U17A. The truth table for the data selector U17A is shown in FIG. 9. The select inputs for the data selector U17A are controlled by the dial indicator 102 on the front panel control as shown in FIG. 4. For example, in the six-up condition, all of the select input terminals of the data selector are maintained high (none are grounded) and thus, terminals D7 of the data selector U17A is connected through to the output terminal M, (see FIG. 10). The output terminal M is utilized to feed data to the main shift register as illustrated in FIGS. 7*a* and 7*b*.

FIG. 6*b* also shows an error detection circuit which comprises a flip-flop U14B and a driver U8B which feeds an error lamp 110 (FIG. 4). The D input terminal of the flip-flop U14B is connected to the 2Y output terminal of the data selector U16A. This output terminal always indicates an sync asterisk signal in either the A-Z or Z-A labeling mode. If the sync asterisk is present, the 2Y output terminal of the data selector U16A will be high, and thus the output terminal Q of flip-flop U14B will be high after clocking. (A clock signal originates from the guillotine sensor circuit to be described below). A high signal at the Q output terminal maintains the error lamp off; however, if a low signal appears, the lamp is energized indicating that no sync asterisk was read and thus the operator should check the form feeding mechanism, print density or scanner alignment.

Head Lockout Control and System Clock

The head lockout mechanism is utilized to stop the paper advance (drive 36 of FIG. 1) if, at any time, material is not fed out of the hopper 60. The material is sensed by means of the medium sensor 92 which provides a signal along line 90. Line 90 is connected to a transistor Q5 whose collector is connected to the input of a Schmitt trigger/inverter U2E. The output of Schmitt trigger/inverter U2E is fed to an inverter U6E which is connected via a delay network (resistor and capacitor) to one input of an OR gate U13B. The other input of the OR gate U13B is supplied directly from the output of Schmitt trigger/inverter U2E. The output of OR gate U13B is connected to the set terminal P of flip-flop U12A. The Q output of flip-flop U12A is the system clock signal and is connected to the clock input terminals of shift registers U21A and U20A. The Q output of flip-flop U12A is also fed to the lower input terminal of OR gate U13D. The $\overline{Q}$ output of flip-flop U12A is connected to the upper input of OR gate U13C and is also connected to a reset terminal P of a flip-flop U18B. The output of OR gates U13C and U13D are fed to the preset and clock terminals of flip-flop U12B, respectively. The $\overline{Q}$ output of flip-flop U12B is connected to an inverter U6B whose output is fed to parallel line drivers U1A and U1B which are utilized to control the head lockout relay (relay 66 of FIG. 1).

Also part of the head lockout control system is the head lockout sensor 50 which provides a high signal on line 84 whenever the aperture of disc 52 is in alignment with the light source 54 and photosensor 56. A "head lock-in" signal is the signal generated when the light beam first strikes the photosensor 56, and a "head lockout" signal is the signal generated after approximately 30° of disc rotation when the photosensor 56 is again blocked. The disc 52 makes one revolution per label cycle. Line 54 is connected to a transistor Q6 whose collector is fed to a Schmitt trigger/inverter U2F. The output of the Schmitt trigger/inverter U2F is fed to an AND gate U3D whose other input is connected to the Q output of flip-flop U12B. The output of AND gate U3D is connected to the clock input of flip-flop U18B. The output of flip-flop U18B is fed to an inverter U6F.

As an example of the operation of the head lockout system, one may assume that the head is locked out (clutch 38 disengaged so that the drive 36 is not driven) and that no media is sensed by the medium sensor 92. In this condition, flip-flops U12A and U12B will both be reset so that the Q outputs are low. When an article appears and passes through the light beam of the medium sensor 92, it reduces the light hitting the photosensor and consequently reduces the current along line 90. Transistor Q5 turns off, which causes the input of Schmitt trigger/inverter U2E to go high and its output low. The filter network on the input of Schmitt trigger/inverter U2E increases noise immunity by delaying the input of the signal for approximately 15 microseconds. Signals less than 15 microseconds will therefore not reach the input of trigger/inverter U2E. The output of trigger/inverter U2E will be squared with a fast rise time and fed to inverter U6E and one input of OR gate U13B. The output of inverter U6E is delayed by the delay network for approximately 3.3 milliseconds before being fed to the other input terminal of OR gate U13B. OR gate U13B provides a low output signal only when both of its inputs are low. The condition of both inputs being low occurs for only 3.3 milliseconds after media is sensed, and at all other times the output of U13B is high. Reference is made to the timing diagram of FIG. 11, which illustrates the output of OR gate U13B together with other elements in the head lockout logic system. Thus, in the example above, when media first appears, a low logic pulse (3.3 milliseconds) will appear at the preset terminal P of flip-flop U12A. The flip-flop U12A thus stores the media present signal. In the preset state, the Q output of the flip-flop U12A is high and the Q output is low. Consequently, the upper input of OR gate U13C will be low and the lower input of OR gate U13D will be high. A little later in the machine cycle, the head lockout sensor will see the slot in the disc 52 and the current will flow on line 84. Transistor Q6 will switch its collector to a low output state, and the signal is inverted and squared-up by Schmitt trigger/inverter U2F. The output of Schmitt trigger/inverter U2F is fed to inverter U6C, and thus the leading edge of the apertured slot in disc 52 causes the output of U6C to go low. The output of inverter U6C is the clock input to flip-flop U12A, however, the negative transition has no effect on the flip-flop state. The output of U6C also appears as the input to OR gates U13C and U13D. The low transition on U13D combined with the high from the Q output of flip-flop U12A causes no change in the output of OR gate U13D and consequently its output remains high. The low transition to OR gate U13C is combined with the low from flip-flop U12A which causes a low output for OR gate U13C. Consequently, the preset terminal P of flip-flop U12B goes low. This flips the state of flip-flop U12B and causes the $\overline{Q}$ output to go low. The low is inverted by inverter U6B and is fed to parallel drivers U1A and U1B. These drivers operate a relay which in turn locks in the head via the clutch mechanism 38.

At approximately 30° rotation of the aperture of disc 52 of the head lockout sensor 50, the output of inverter U6C is switched high. This corresponds to the blocking of the light beam between light source 54 and photosensor 56. As a consequence, flip-flop U12A is reset and the Q output is low with the $\overline{Q}$ output high. This condition places both inputs to the OR gate U13C high, which causes its output to go high. The preset on flip-flop U12B is consequently released (the flip-flop does not change state). The upper input of OR gate U13D goes high and, a short time later, the time to reset flip-flop U12A, the lower input of OR gate U13D goes low. At no time are both inputs low simultaneously so that the output of OR gate U13D remains high. The process is repeated in successive cycles as each piece of media is fed out of the hopper 60 and sensed by the medium sensor 92. The negative transition on the output of inverter U6C will appear when the slot in the apertured disc of the head lockout sensor 50 appears. The output of OR gate U13C goes low on the negative transition and remains low until the positive transition occurs approximately 30° of rotation later. Since flip-flop U12B is already set, the low on the preset will have no effect and the head will remain locked in. Thus, the positive transition of the head lockout sensor will reset the media storage flip-flop U12A, and the head is locked in for each cycle in which media is present.

Figure 11:
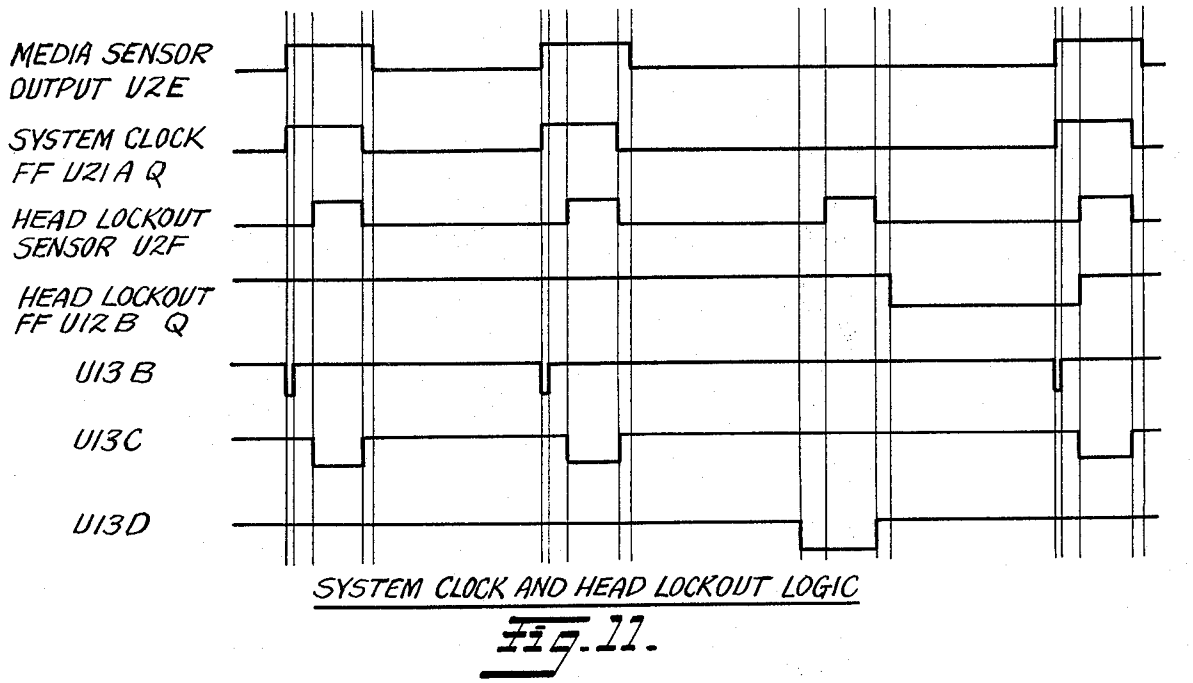

One may now assume that the head is locked in but the media in the hopper is exhausted. In this case, flip-flop U12A remains reset because no media is detected. This situation is illustrated in FIG. 11 in the third machine cycle. When the slot in disc 52 appears, the clock will have been high on the input to U12A and on the lower input of OR gate U13C and the upper input of OR gate U13D. The upper input of OR gate U13C will be high because flip-flop U12A is reset. This condition provides two highs for the inputs to OR gate U13C which causes a high output. The high output of OR gate U13C has no effect on the preset of flip-flop U12B. In addition, the low on the lower input of OR gate U13D combined with the high on the upper input of OR gate U13D causes its output to be high. Since the high on the output of OR gate U13D has been present all along, a clock signal is not generated. Thus, when the slot of the disc appears, the output of inverter U6C goes low and the negative transition results in both inputs of U13D being low, providing a low output. This negative transition has no effect on flip-flop U12B. The output of OR gate U13C remains high because the upper input remains high. When the slot rotates the 30° subsequently blocking the light path, the output of inverter U6C returns to its high state. The transition has no effect on flip-flop U12A because it is already reset. In addition, the high on the lower input of OR gate U13C does not change its output which also remains high. However, the high transition on the upper input of OR gate U13D combined with the low on its lower input causes a high output which is a positive transition for the clock input of the flip-flop U12B, causing a clock operation (see U13D graph of FIG. 11). This clock signal will load the ground input on the D input of flip-flop U12B to its Q output terminal. The Q was previously high and it now flips to its low state. This will reset the flip-flop and in effect lock out the head via the clutch mechanism 38 so as to prevent further advancement of the computer form 10. In this mode of operation, each time the slot appears, nothing happens to either flip-flop U12A or U12B. When the slot on disc 52 rotates into the blocking position, the resulting positive transition on inverter U6C causes the clocking operation on flip-flop U12B through OR gate U13D. However, since the flip-flop U12B is already reset, the loading of a low on the D input will not cause a change of state of flip-flop U12B and the head mechanism remains locked out.

In summary, the head locks in when media appears and this condition is remembered or stored in flip-flop U12A. The head lockout information is stored in flip-flop U12B. Once locked in, the flip-flop U12B will remain in the same state as long as media reappears each machine cycle. The media memory flip-flop reacts each machine cycle. When the head locks in, it does so on the appearance of the slot in disc 52. When no media is present, the head locks out on the disappearance of the slot. On successive cycles of media flow, the preset input of flip-flop U12B will go low each cycle, but the output of flip-flop U12B remains in the set state. On successsive cycles of no media, the clock input of flip-flop U12B will go high each cycle (positive transition) which loads a low on output Q of flip-flop U12B. After the first cycle, the output is reset and additional clock signals have no effect. As a consequence, the head will always lock in at an earlier portion of the machine cycle than it locks out.

Margin Block Loading in Shift Register

Shift registers U21A and U20A feed the first stages of the main shift register 126. As the form 10 advances, a block of asterisks is read corresponding to the adjacent line of labels and is stored in shift registers U11A and U15A for transfer to shift registers U21A and U20A via the data selector U16A. The loading of shift registers U21A and U20A is initiated by the occurrence of a guillotine signal derived from the guillotine sensor 18 of FIG. 1. The guillotine signal arrives (notch 28 breaks the light beam to photosensor 34) when the form 10, is cut, at which time the form movement is temporarily stopped via mechanical means (not shown).

The logic elements controlling the operation of the loading of shift registers U21A and U20A comprises a flip-flop which stores the signal from the guillotine sensor (cross-coupled gates U19A and U19B), a flip-flop which controls the resetting of the logic after loading (flip-flop U18A) and a flip-flop which stores the position of the disc of the head lockout sensor (flip-flop U18B). The timing diagram for the loading sequence is shown in FIG. 12 and reference is made thereto for operation of the guillotine logic circuitry.

When the notch 28 breaks the light beam to photosensor 34, the signal on line 82 goes low which turns off transistor Q7 causing a high input to Schmitt trigger/inverter U2C. The output of trigger U2C consequently goes low which sets the flip-flop U19A-U19B causing the output of U19A to go high and the output of U19B to go low. As long as the notch 28 blocks the light beam, the output signal of trigger U2C will be low. The upper input of NAND gate U19D is also low which maintains the output of NAND gate U19D high, thus preventing the resetting of flip-flop U19A-U19B. (A low sets flip-flop U19A-U19B if it is on the upper input of U19A and resets the flip-flop if its on the lower input of U19B).

Figure 12:
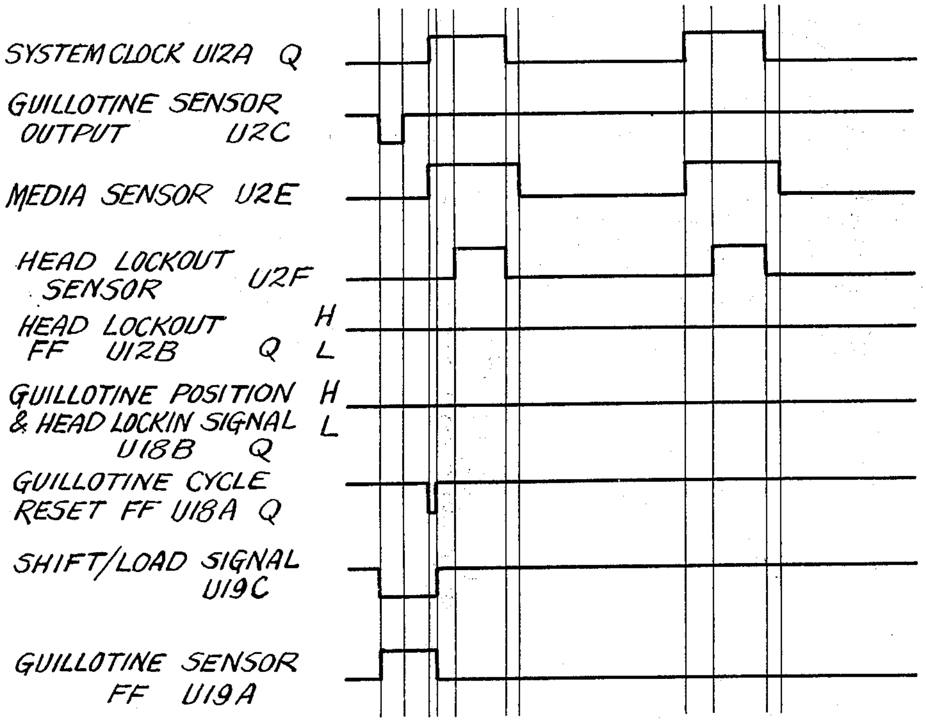

As can be seen in FIG. 12, as long as media is flowing (no head lockout), the system clock, which is the Q output of flip-flop U12A, will switch each machine cycle. The lower output $\overline{Q}$ of flip-flop U12A goes to the reset (CLR) input of flip-flop U18B, and the low output on Q of flip-flop U18B is inverted by inverter U6F and appears as high on the lower input of NAND gate U19C. With the upper input of U19C high, the output of NAND gate U19C goes low which primes the shift registers U20A and U21A for loading on the next clock pulse. The next time media is detected, the Q output of U12A goes high which loads the shift registers U21A and U20A, and also toggles flip-flop U18A. A low signal is produced on the Q output of U18A, which resets flip-flop U14A, as well as shift registers U11A and U15A. The reset signal thus prepares the shift registers U11A and U15A for additional loading of new data.

The $\overline{Q}$ output of flip-flop U18A goes to the lower input of NAND gate U19D. Thus, when the guillotine sensor signal on line 82 returns to the high state, the upper input to NAND gate U19D is high and the lower input low. After a 1.5 millisecond delay caused by the resistor capacitor filter network, the lower input of NAND gate U19B will go low, thus resetting flip-flop U19A-U19B. The output of NAND gate U19A thus goes low which signal appears on the preset input of flip-flop of U18A, and it presets to the Q high and $\overline{Q}$ low state.

Subsequent cycles in which material is snesed produces the system clock signal on the Q output of flip-flop U12A, which is used to shift stages in the shift registers U21A and U20A. The guillotine signal is produced once for each revolution of disc 30 which corresponds to one revolution per line of labels (four label cycles per four-up form, five label cycles per five-up form, etc.).

Figure 13:
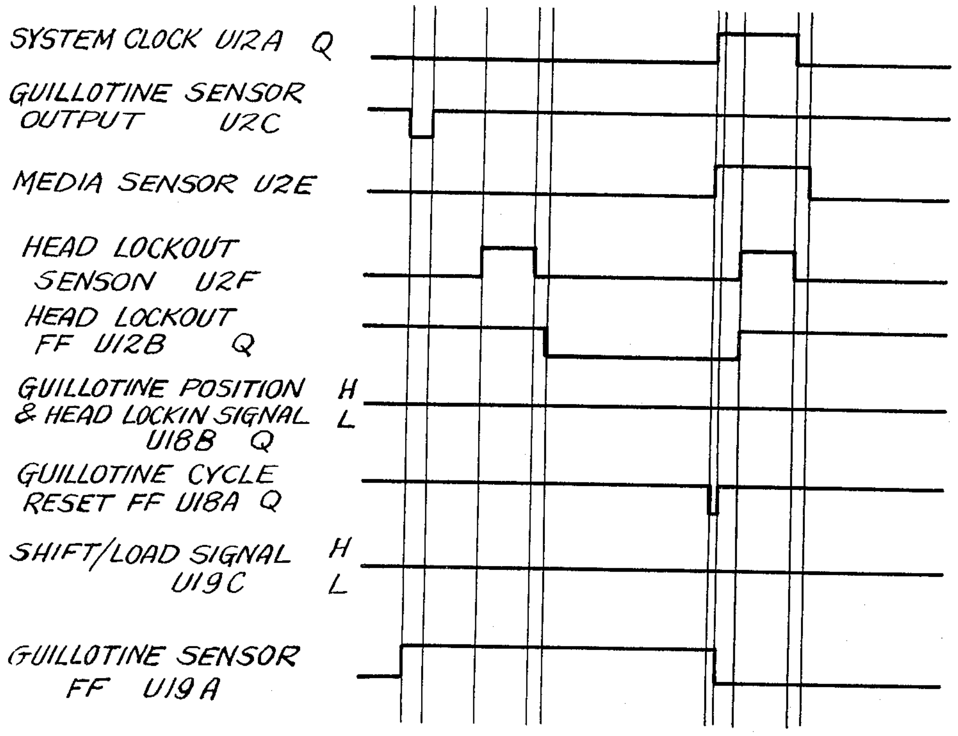

FIG. 13 is the timing diagram for the guillotine sensor and loading sequence operation when no media is present after the signal from the guillotine sensor has occurred. In this case, flip-flop U19A-U19B will be set by a low level from U2C as before. However, the system clock signal will not now appear so the flip-flop U12A will remain reset for the entire machine cycle. Flip-flop U12B will reset on the head lockout signal which appears at the output of trigger U2F. On the head lock-in signal, flip-flop U12B is set and its Q output high. This output is fed to the upper input of AND gate U3D with the lower input fed by the output of trigger U2F. The output of AND gate U3D clocks flip-flop U18B, but since the D input of flip-flop U18B is low, the Q output maintains its low state so that flip-flop U18B does not change. Consequently, the lower input to NAND gate U19C is maintained high, and its output low so that the shift registers U21A and U20A are primed for loading whenever media is sensed. As shown in FIG. 13, the first label cycle has no media present. The head lockout sensor may be utilized as a reference in comparing the two cycles with and without media.

Figure 14:
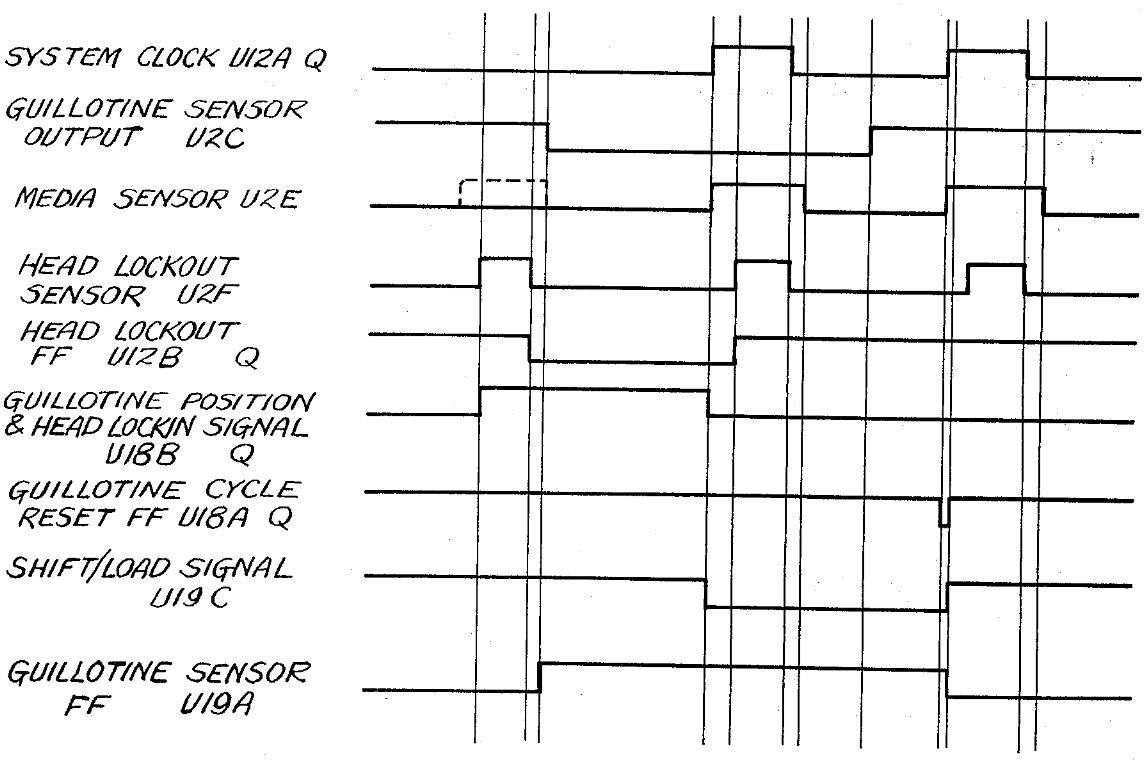

The most complicated loading operation occurs when the guillotine sense signal on line 82 appears as the head is locking out (via signal to clutch 38). In this case, media is not present and the head lock-in signal appears before the guillotine signal, but both signals occur in the same machine cycle. In effect, the head is locking out because no material is present, but head creep causes the guillotine notch to break the light beam prematurely. In this case, the guillotine disc 30 is ahead of where it should be in relation to the other logic signals. The operation of the guillotine sense and loading sequence for the conditions described above is illustrated by the timing diagram of FIG. 14.

In the normal sequence of events, the medium signal occurs first in a machine cycle. At sometime later, depending on label placement, the head lock-in signal appears followed by the guillotine signal if it occurs on the instant label. All three signals, the media present signal, head lock-in signal and guillotine signal occur in the same machine cycle. Again, in normal operation, if the head locks out because of lack of media, the guillotine disc 30 will come to rest just before the light beam is broken. However, disc 30 will come to rest quickly only if the head (drive 36) is moving slowly. If the head is moving quickly, however, the head will creep to a stop after the lockout signal and the disc will break the guillotine light beam. This causes the signal to be read in the wrong machine cycle. Normally, the guillotine signal would not be detected until after the next piece of media is detected, but that piece has not yet been fed from the hopper. In this case, flip-flop U18B prevents the guillotine initiated loading sequence from occurring until the additional piece of media has been fed from the hopper.

As an example, assume media stops flowing and the guillotine disc blocks the guillotine sensor light beam because of head creep. On the cycle that head lockout occurs no media appears. A phantom medium is shown in dotted lines on FIG. 14. The flip-flop U12A will remain reset for the entire machine cycle as no system clock signal will be generated. At the head lockout signal, the head locks out (Q output of U12B goes low). Shortly thereafter, the guillotine signal will appear as the head creeps to a stop after lockout. Since the guillotine signal has been received but really is premature, it is desired to delay the loading of the asterisk block until after the next media present signal. This is done by storing the condition of the guillotine sensor flip-flop U19A-U19B at the time of the head lock-in signal. The head lock-in signal always occurs after the media sensor would detect media, if it were present, and this information is stored in flip-flop U18B. If the guillotine sensor flip-flop U19A-U19B indicates that the guillotine signal had not been received at the time of the head lock-in signal, the logic would ignore it if it appeared after the head lock-in signal, until one more article had been fed. If the guillotine signal were present at the time of the head lock-in signal, it would be logically proper to load the asterisk block on the next piece of media.

Specifically, with no media present, flip-flop U12A remains reset. At the time of the head lock-in signal, the head lockout flip-flop U12B will still be set indicating the head is locked-in. The high on the Q output of flip-flop U12B appears on the upper input of AND gate U3D. The output of trigger U2F will go high on the head lock-in signal. This will appear on the lower input of AND gate U3D and both inputs high will cause its output to go high. This transition will clock flip-flop U18B. Since the guillotine signal has not been received yet, the output of NAND gate U19B will be high, and this signal appears on the D input of flip-flop U18B. The clocking of the flip-flop U18B loads the high on its D input, and this high appears on the Q output. The signal is inverted by inverter U6F, and it appears as a low on the lower input NAND gate U19C. This low holds the output of NAND gate U19C high and inhibits loading the asterisk code.

As the head comes to a stop, the guillotine signal is received, and the flip-flop U19A-U19B is set. This causes the NAND gate U19A output to go high, and it will appear as the upper input of NAND gate U19C. When media flows again, the flip-flop U12A will be set. The Q output of flip-flop U12A will clock the system, causing a shift of shift registers U21A and U20A. The $\bar{Q}$ output of U12A will appear on the reset input of U18B and reset it. This will release the inhibit on NAND gate U19C. On the next piece of media the loading operation will occur as described in FIG. 12. The effect of flip-flop U18B was to inhibit the loading of the asterisk code by one step to counteract the presence of the guillotine signal, which was received too early because of the head lockout creep.

Main Shift Register and Control Signal

The main shift register 126 of FIG. 5 is shown in detail in FIGS. 7*a* and 7*b*, comprises a plurality of 8 stage shift registers all strobed by the system clock signal fed from line SC of FIG. 66. The plurality of shift registers El–E9 are connected in series and the total number of stages utilized will depend upon the label width, the distance from the reading means 4 to the guillotine knife 20 and whether a 3, 4, 5 or 6 up form is used. Selected outputs of various stages of the three shift registers are fed to input terminals 1A–1D and 2A–2D of dual four line to two line data selectors F1 and F2, as shown in the schematic. For example, output terminal g of shift register E1 is connected to input terminal 1C of data selector F1. The connections to the input terminals of the data selectors F1 and F2 are chosen such that for a preferred distance of 6 inches from the reading means 4 to the guillotine knife 20, the three-up labeling lines are connected to terminals 1A–1D of data selector F1, the four-up lines to terminals 2A–2D of data selector F1, the five-up lines to terminals 1A–1D of data selector F2 and the six-up lines to terminals 2A–2D of data selector F2. Within each group of lines, the one half inch label width corresponds to the largest number of stages needed in the main shift register 126 which is seen to be the D input terminal; the 1 inch label width corresponds to the A input terminals; the 1½ inch label width corresponds to the B input terminals; and the 2 inch label width corresponds to the C input terminals. The label width indicator and dial 104 is a single wafer switch on the front panel control (FIG. 4) and is used to provide select signals to the data selectors F1 and F2 over lines X1, X2 and X3. As the 1 inch label width is the most common, a 1 inch setting on the dial 104 leaves all input lines X1, X2 and X3 floating which results in all high input signals to NAND gates U3A and U3B. This condition gives low output signals which are fed to select terminals, SELA and SELB of data selectors F1 and F2. The low, low condition for select lines SELA and SELB connects the A input terminals of data selectors F1 and F2 to the output Y terminals corresponding to the desired 1 inch width choice. Similarly, moving dial 104 to one half inch width grounds line X2 resulting in a high, high state for the output of NAND gates U3A and U3B, respectively, which in turn connects the D input terminals of data selectors F1 and F2 to the Y output terminals. The selections for the entire range of width choices is shown in the following table:

| SELA | SELB | WIDTH CHOICE | DATA SELECTOR F1 or F2 INPUT | OUTPUT |
|---|---|---|---|---|
| L | L | 1" | A | Y |
| L | H | 2" | C | Y |
| H | L | 1½" | B | Y |
| H | H | ½" | D | Y |

The Y output terminals of the data selectors F1 and F2 are connected to a single wafer switch associated with the label across indicator and dial 102 along output lines Z3–Z6 corresponding to the 3–6 up label across choices, respectively. The output from the switch is fed to input signal line P in FIG. 7*a* for use in the feeder lockout system described below. Thus, the code information appearing on code sections 8 of form 10 are stored and shifted in main shift register 126, and the data is fed out as a control signal along line P (FIG. 7*a*) when a given label, the last in a group of common zip codes, for example, has been cut by roller cutter 44 and it is desired to provide a physical indication that a new group of labels is to be applied to subsequent articles fed from hopper 60. The control signal along line P may be used, for example, to provide a physical mark on the last member of the zip code group or to actuate a kicker mechanism to mis-align the article on the conveyor belt after labeling. In the preferred embodiment of the invention, the control signal along line P is used to lockout (arrest) the shuttle 62 which feeds out articles from the hopper 60 so that there is a physical separation of different label groups (zip codes, for example) along the conveyor itself. The physical spacing along the conveyor allows one to easily separate the labeled articles either manually or automatically.

The main shift register 126 is reset at the beginning of machine operation by means of a negative pulse (approximately 500 milliseconds) at the output of inverter U4E. The input of inverter U4E is derived from a pulse generating circuit activated along reset line E when the power to the machine is first turned on. In effect, all stages of the shift register 125 are loaded with lows so that random loading will not cause spurious feeder lockouts during the initial label cycles. Thus, the first labeled articles are not sorted (approximately six lines of label data for a 6 inch distance from guillotine to reader) as the label head 2 must be initially loaded with the form 10 during which time the reader is not operative.

FEEDER LOCKOUT CONTROL

One method of indicating a change in label data such as zip code is to provide a halt in material feed to physically separate zip code groups. The feeder lockout logic is shown in FIG. 7*a* and 7*b* and comprises flip-flop U2B-U2A, shift register U9A, flip-flops U11B, U11A, and U12A, and miscellaneous gates U3D, U10C, U10D, U2D, U10A, U4A, U5D, and U10B. The feeder must lock out at a precise time each machine cycle. The time is controlled by the disc 70 which is part of the feeder lockout sensor 72. Disc 70 has a slot or aperture approximately 30° long similar to the disc 52. When the slot appears (light unblocked), the photosensor 76 turns on and causes a high output on line 86. The collector of transistor Q8 goes low which sets flip-flop U2B-U2A causing NAND gate U2B output to go high. The output of NAND gate U2B provides a clock signal termed the "feeder lockout clock". The output of NAND gate U2B is fed to the clock input of shift register U9A and also to the lower input of NAND gate U3D. Shift register U9A counts the number of lockout cycles. At the end of the 30° slot of disc 70, the feeder signal goes low which causes the collector of Q8 to go high. The high signal appears on the upper input of NAND gate U3D. With both inputs of NAND gate U3D high, its output will go low. After a 1.5 millisecond delay this low will appear on the lower input of NAND gate U2A, causing flip-flop U2B-U2A to reset. The delay and the resetting occurring after the trailing edge of the signal provides maximum noise immunity, and reduces the risk of double clocking caused by noise on the leading and trailing edges of the feeder lockout signal. The control signal which indicates a desired feeder lockout condition appears on input terminal P and is a high level for lockout. The signal is inverted by gate U4B and appears as a low on the upper input of NAND gate U10C. The output of U10C goes high, which in turn appears as a high on the serial input SI of shift register U9A. Between feeder lockout signals, flip-flops U11B, U11A, and U12A are all reset, so that their Q outputs are low. The control signal appears with the system clock and the feeder lockout clock always appears later in time. Inverters U1A, U1B, U1C, U1D and U1E have inputs connected to the outputs of the shift register U9A for 1, 2, 3, 4, and 6 lockout cycles, respectively. The inverter outputs are connected to lines W1–W6 and feed low logic signals when the proper number of cycles has been reached. These lines are connected to a rotary switch of conveyor spacing dial 112 of FIG. 4 which selects one of the outputs. The common terminal of the rotary switch is attached to the line 160 of FIG. 7*a*, the "end lockout" line.

As the machine is running, when no lockout is present the shift register U9A is clocked each machine cycle. The control signal on line P will be low and will be inverted to high by inverter U4B. This places two highs on the inputs of gate 10C, and its output will be low. No lockout will occur under these conditions. When the input P goes high, the output of inverter U4B is low, and the output of U10C goes high. On the next feeder lockout clock the shift register U9A will shift into register terminal a the high on its serial input, while terminals *b* to *h* remain low for the time being. The $\overline{Q}$ output of flip-flop U11A is high and appears on the upper input of NAND gate U10A. The high output at terminal a of shift register U9A appears on the lower input of NAND gate U10A. This causes its output to go low, and after a 3 us delay presets flip-flop U11B. The $\overline{Q}$ output of U11B goes low, and it appears on the preset input of flip-flop U11A. This causes the $\overline{Q}$ output of flip-flop U11A to go low, which changes the upper input to NAND gate U10A to low, and the output goes high releasing the preset but not changing the state of the flip-flop U11B. The low on the $\overline{Q}$ output of U11A also appears on the lower input of NAND gate U10C holding its output high. This insures that each feeder lockout clock will load highs into shift register U9A during lockout. The Q output of U11A is now high, and the high signal goes to inverter U1F, and the inverter low signal is amplified by amplifier U8A which operates solenoid 66 (FIG. 1) to lockout the shuttle (feeder). If the rotary switch of the conveyor spacing dial 112 is positioned to connect line W3 with end lockout line 160, the feeder lockout clock will clock three more times. On the next clock, terminals *a* and *b* of shift register U9A will go high. On the following clock signal terminals *a*, *b* and *c* will be high, and on the third clock signal terminals *a*, *b*, *c* and *d* will be high. The high on terminal *d* will be inverted by inverter U1C and appear on the end lockout input line 160 as a low terminating the feeder lockout. Backing up to the initial lockout cycle, after the feeder lockout clock signal shifted the shift register U9A, the output terminal a of shift register U9A went high. Flip-flops U11B and U11A also were preset. Setting flip-flop U11A locked out the feeder. The control signal to lockout the feeder solenoid occurs on the feeder shuttle backstroke, and the shuttle will deliver one more piece of material on the forward stroke and then stop. This last piece of media will appear before the next feeder lockout clock signal. This last piece of media activates the system clock, which appears on the clock input of flip-flop U11B via gates A5B and A2C. If the signal appears, it resets U11B because the D input is low. The resulting low on the Q output appears on the D input of flip-flop U11A. While running, the upper input of NAND gate U2D is high. This is the system reset and is low only when power is first applied. When the proper number of lockout cycles have occurred, the end lockout signal on line 160 will go low. This causes the output of NAND gate U2D to go high. This clocks flip-flop U11A and resets it because of the low on its D input. The end lockout signal on line 160 is then removed, and the feeder will again feed media. Also, the high on NAND gate U2D will appear on the upper input of NAND gate U10D. The lower input will be high, since flip-flop U11B is also reset and $\overline{Q}$ will be high. This causes the output of gate U10D to go low. The low appears on the clear input of shift register U9A and it resets all outputs low.

The system operates differently if the last piece of media does not feed after the control signal is given. If the machine has been running without a lockout, flip-flops U11B, U11A and U16A are all reset with their Q outputs low. Shift register U9A is reset and all outputs are low. In each machine cycle the output of NAND gate U2B goes high for the dwell of the feeder lockout disc 30°. When a high signal is received on line P, the lockout sequence begins with the next high from gate U2B, the feeder lockout clock. The output terminal a of shift register U9A will go high. This occurred because the high on line P is inverted to a low by inverter U4B and that low on the upper input of gate U10C caused its output to go high. This high level on the serial input of U9A is shifted in by the clock.

The high on terminal a of shift register U9A appears on the lower input of NAND gate U10A. The upper input is high, because flip-flop U11A is reset and its $\overline{Q}$ output is high. The output of gate U10A goes low, and after a 3 us delay sets flip-flop U11B. The $\overline{Q}$ output of flip-flop U11B goes low and sets flip-flop U11A. The low output of $\overline{Q}$ on flip-flop U11A releases the preset on flip-flop U11B through gate U10A. The low also appears on the lower input of NAND gate U10C and holds its output high. This will insure that highs will be shifted into the serial input of shift register U9A. The high on the Q output of flip-flop U11A will also release the clear on flip-flop U12A. The high on the Q output of flip-flop U11B will appear on the lower input of NAND gate U10B.

In this case, the last piece of media will not feed after the lockout signal is given. This means that the clock which should appear on the clock input of flip-flop U11B will not occur and the flip-flop will not reset. As the feeder lockout clock clocks the shift register on the next machine cycle, terminals *a* and *b* will be high on shift register U9A. The high on terminal *b* will appear on the upper input of NAND gate U10B and, with the lower input being high, its output will go low and set flip-flop U12A. The $\overline{Q}$ output of flip-flop U12A will go low and a signal will be fed to energize the "incomplete zip lamp" and/or operate a buzzer. The incomplete zip lamp is shown in FIG. 4. The feeder lockout clock will continue to clock the shift register, and the shift register will shift highs through the output steps. If we assume that three lockout cycles were desired, then, when terminal d goes high the output W3 will go low through U1C and will appear as a low on the lower input of U2D. This will clock flip-flop U11A. Since the D input of U11A is high and the flip-flop was already set, it does not change state. The high on the upper input of NAND gate U10D also does nothing, because the lower input is low. The shift register U9A continues to load until terminal h goes high. At this time, the high on terminal h appears on the input of inverter U4A. The output of inverter U4A will go low, which in turn causes the input of AND gate U5D to go low. The output of U5D will also go low and reset flip-flop U11B. The resulting resetting of flip-flop U11B will cause its $\overline{Q}$ output to go high. This will cause both inputs of NAND gate U10D to be high and its output low. Shift register U9A will reset all its output from the low on its clear input CLR. The Q output of flip-flop U11B will be low, and this will appear on the D input of flip-flop U11A. The end lockout signal along line 160 will return high, because shift register U9A was reset. Flip-flop U11A is still set, and its $\overline{Q}$ output, which is low, maintains a high serial input to shift register U9A through gate U10C. After one feeder lockout clock signal, terminal a will again be high. It will not switch the output of U10A this time, because the $\overline{Q}$ output of U11A is low. After four feeder lockout sensor cycles, the terminals *a*, *b*, *c* and *d* of shift register U9A will be high. The terminal *d* output will appear as a low on the end lockout input line 160 through inverter U1C and the conveyor spacing selector switch. The low on gate U2D will cause flip-flop U11A to reset. The Q output of flip-flop U11A will go low and operate the clear input of flip-flop U12A and reset it. This will turn off the incomplete zip lamp and/or buzzer. The low on Q of flip-flop U11A will also lock-in the feeder through inverter U1F, driver U8A and its associated solenoid (relay). The two inputs of U10D will also be high, and the resulting low output will reset shift register U9A. At this point the entire system is reset and normal feeding will begin. The misfeed which prevented the last piece of media from being delivered from the feeder caused an extra long lockout cycle and also provided a visual and/or audible indication of the malfunction.

The feeder lockout system may be disabled by positioning the conveyor spacing indicator and dial 112 to the "off" position. The off position grounds the "L-reset" line of FIG. **7*a*** so that feeder lockout will not occur. In this mode, however, the control signal along line P may be utilized for other forms of indicating a change in label group such as marking the article or displacing the article from the normal orientation of articles on the output conveyor.

The components which may be utilized in the prefereed embodiment of the invention are given below by way of example. All elements are readily available and manufactured by Texas Instruments Incorporated, Dallas, Tex.

| Component | Serial Number |
|---|---|
| Data selector U10A and U16A | 74157 |
| Data selector U17A | 74151 |
| Data selector F1 and F2 | 74153 |
| Schmitt trigger/inverters U2E, U2F, etc. | 7414 |
| NAND gates | 7400 |
| AND gates | 7408 |
| Inverters | 7404 |
| Shift registers U11A, U15A | 7496 |
| Shift registers U21A, U20A | 74195 |
| Shift registers E1-E9, U9A | 74164 |
| Schmitt Trigger/nand gates U213 and U2A | 74132 |
| Flip-flops | 7474 |
| Amplifiers U4 and U5 | 72741 |
| Drivers U7A, U7B, etc. | 75451A |

Although the invention has been described with reference to the preferred embodiment, it is understood that modification and improvements may be evident to those skilled in the art, and the invention is intended to cover all such modifications which do not depart from the spirit and scope of the invention.

I claim:

1. Apparatus for producing a control signal in response to a data code read from a sheet-like form, said form having a plurality of rows of labels, said rows having a plurality of labels and an adjacent data code identifying groups of labels, said form being fed to labeling means for cutting and application of said labels to conveyed articles, said apparatus comprising:

means for reading the data code adjacent the rows of labels, said reading means providing code signals, means for producing an orientation signal indicative of which end of the sheet-like form is first fed into the labeling means, said reading means adapted for reading said data code irrespective of which end of said sheet-like form is first fed into said labeling means, electronic control means responsive to said code signals and said orientation signal for providing a control signal, for data code identified groups of conveyed articles irrespective of which end of said sheet-like form is first fed into said labeling means, and means for providing a visual indication of data code identified groups of conveyed articles labeled by said labeling means, said indication means responsive to said control signal.

2. Apparatus as recited in claim 1 wherein said visual indication means comprises means for stopping said labeling means to introduce physical spacings between data code identified groups of conveyed articles.

3. Apparatus as recited in claim 1 wherein said visual indication means comprises means for marking said code identified groups of conveyed articles.

4. Apparatus as recited in claim 1 wherein said visual indication means comprises means for displacing said conveyed articles labeled by said labeling means.

5. Apparatus as recited in claim 1 further comprising means for producing a label number signal indicative of the number of labels in each row of said sheet-like form and wherein said electronic control means is responsive to said label number signal.

6. Apparatus as recited in claim 5 wherein said electronic control means comprises:

a first plurality of storage registers for storing said code signals for a row of labels, first data selection means having input terminals and output terminals, said input terminals connected to some of said first plurality of registers, and said first data selection means responsive to said orientation signal for connecting together selected ones of its input and output terminals, a second plurality of storage registers connected to the other of said first plurality of registers and to said plurality of first data selection output terminals, said second plurality of storage registers being connected to form a shift register.

second data selection means having input terminals and output terminals, said input terminals connected to at least some of said second plurality of storage registers, said second data selection means responsive to said label number signal for connecting together selected ones of its input and output terminals, main shift register means for storing and shifting code signals form the output terminals of said second data selection means, and third data selection means connected to said main shift register means for selecting one register of said main shift register, said third data selection means including means responsive to the number of labels in each row of said sheet-like form, whereby said control signal is produced by said selected one register of said main shift register and said third data selection means.

7. Apparatus as recited in claim 6 further comprising means for producing a label width signal corresponding to the width of labels on said sheet-like form and said third data selection means is responsive to said label width signal.

8. Apparatus as recited in claim 1 further comprising:

means for producing a label width signal corresponding to the width of labels on said sheet-like form, and switch means settable to correspond to the number of labels in a row of labels, and said electronic control means comprises:

a shift register for shifting and storing code signals from said reading means, and connection means responsive to said label width signal and said switch means for connecting predetermined registers of said shift register to said indication means, one of said predetermined registers providing said control signal.

9. Apparatus as recited in claim 8 further comprising:

means for storing articles before labeling by said labeling means, means for feeding articles from said storing means to said labeling means, and article sensor means for detecting articles fed from said storage means to said labeling means, said article sensor means providing clock signals for clocking said shift register.

10. Apparatus as recited in claim 9 wherein said control signal locks out said feeding means and thereby inhibits said feeding means from feeding articles to said labeling means.

11. Apparatus as recited in claim 10 further comprising means for variably controlling feeding lockout time.

12. Apparatus as recited in claim 1 wherein said sheet-like form may be oriented in one of two positions, head first position and foot first position, and said data code identifies the last label in a group of labels, and said electronic control means comprises a shift register for storing and shifting said code signals from said reading means, and means for delaying the loading of said code signals within registers of said shift register for said head first position relative to said foot first position.

13. Apparatus for producing a control signal in response to a data code read from a sheet-like form, said form having a plurality of rows of labels, said rows having a plurality of labels and an adjacent data code identifying groups of labels, said form being fed to labeling means for cutting and application of said labels to conveyed articles, said apparatus comprising:

means for reading the data code adjacent the rows of labels, said reading means providing code signals, manual means for producing an orientation signal indicative of which end of the sheet like form is first fed into the labeling means, electronic control means responsive to said code signals and said orientation signal for providing a control signal, and means for providing a visual indication of data code identified groups of conveyed articles labeled by said labeling means, said indication means responsive to said control signal.

14. Apparatus as recited in claim 13 wherein said data code comprises two columns of data for each row of labels and wherein said reading means comprises a separate, single code detector for each column.

* * * * *